C. J. CLEMENTS.
TOGGLE BOLT.
APPLICATION FILED FEB. 18, 1911.
991,426.
Patented May 2, 1911.
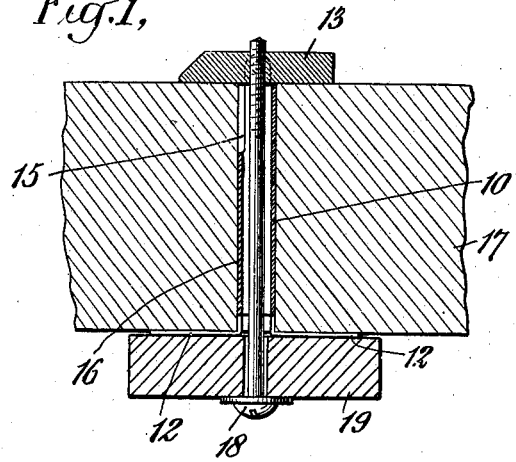
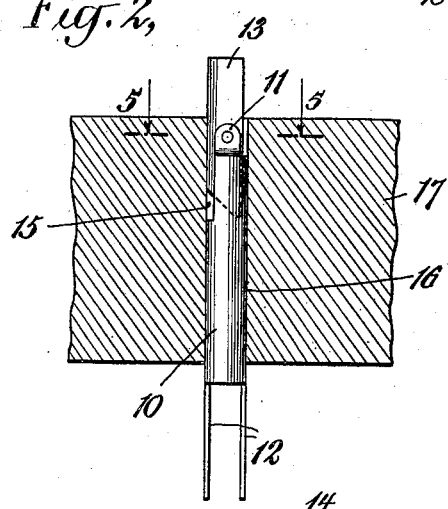
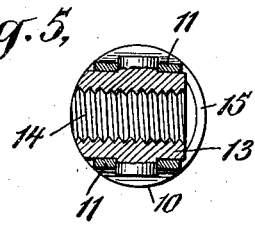
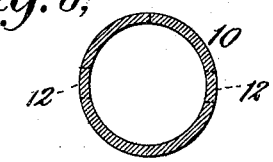
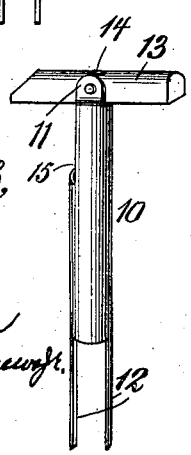
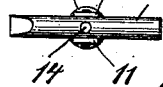
WITNESSES:
INVENTOR
Charles J. Clements
BY
his ATTORNEYS

UNITED STATES PATENT OFFICE.

CHARLES J. CLEMENTS, OF BROOKLYN, NEW YORK.

TOGGLE-BOLT.

991,426. Specification of Letters Patent. Patented May 2, 1911.

Application filed February 18, 1911. Serial No. 609,340.

*To all whom it may concern:*

Be it known that I, CHARLES J. CLEMENTS, a citizen of the United States of America, and a resident of Brooklyn, county of Kings, and State of New York, have invented certain new and useful Improvements in Toggle-Bolts, of which the following is a specification, reference being had to the accompanying drawings, forming a part thereof.
My invention relates to toggle bolts of the type employed for securing articles to lath and plaster walls and similar structures wherein the material of which they are composed is not adapted to be screw-threaded for coaction with a threaded bolt, or to coact frictionally with a retaining means. In work of this character the retaining element is to be concealed within the wall or similar structure, yet ready access cannot be had to the interior thereof, except through a small bolt receiving hole specially made for the purpose and which must be completely covered by the article secured to the wall by the toggle bolt. The toggle bolts employed for the purpose comprise not less than three parts of which the bolt element is one, and the nut element includes the other two, the said nut element comprising a holder and an anchor part movable with respect thereto from a longitudinal position while the nut element is being inserted, to a transverse position after it has been so inserted, (for instance, in lath and plaster walls the said anchor part moves to a transverse position after it has reached a position to the rear of the laths) the holder or the anchor part, being screw-threaded to receive the threaded portion of the bolt. The nut element is usually inserted into place after it has been partly screwed on to the bolt, but this is objectionable first, because it usually entails the bolt being first inserted through a part of the article to be secured in place, and the consequent handling of the article while the nut is being inserted, and second, it requires that the bolt be of an otherwise unnecessary length because the nut must be inserted much farther than its final position requires, in order that the anchor element be free to swing over into place at right angles to the holder at the rear of the structure. Again there is commonly nothing to retain the nut in position except the bolt, and should the bolt be removed from engagement with the nut, either purposely, or accidentally by unscrewing the bolt too far when the intention is to remove both bolt and nut, the nut is apt to fall and be lost within the wall.

In carrying out my present invention I provide a special form of holder by which the nut element may be inserted in position before the bolt has been applied thereto, and I provide the holder with one or more extensions which are adapted to be bent into place after the nut element has been so inserted and the anchor part has been adjusted into position, whereby the said nut element will be retained in place entirely independently of the bolt, and the latter may be removed and replaced at will without the danger of losing the nut.

In addition to the broader features of my invention, the same also comprises certain novel features of construction and combinations of parts, all as will be fully pointed out hereinafter, together with further advantages which follow as a result of my invention, and in order that my invention may be thoroughly understood I will now proceed to describe an embodiment thereof, having reference to the accompanying drawings illustrating the same, and will then point out the novel features in claims.

In the drawings: Figure 1 is a view in central longitudinal section through a toggle bolt constructed in accordance with my invention, showing the same employed in use. Fig. 2 is a view in side elevation of the nut element, showing the same as being inserted into place. Fig. 3 is a detail view in perspective of the nut element. Fig. 4 is a detail end view thereof. Fig. 5 is a detail transverse sectional view therethrough upon an enlarged scale, the plane of section being indicated by the line 5—5 in Fig. 2. Fig. 6 is a detail view in transverse section through the tubular body part of the holder portion of the nut element.

The nut element comprises a tubular holder 10 having ears which extend longitudinally at one end, and lugs or fingers 12 which extend longitudinally at the other end. Pivotally connected to the ears 11 is an anchor bar 13, the same being transversely screw-threaded as at 14, and constituting in the present example of my invention the nut proper. The holder is slotted at one side thereof as at 15, to permit the anchor part to swing into a longitudinal position as shown in Fig. 2 of the drawings, to permit the ready insertion of the same through a hole 16 of a size no more than just large enough to receive the holder.

In use the nut is inserted through the hole 16 in a wall or similar structure 17, as shown in Fig. 2, the anchor part being adjusted in its lengthwise position as shown. During the act of inserting the nut the device may be grasped by the forwardly extending lugs or fingers 12. After the device has been inserted to a position wherein the anchor element is free to move to a transverse position it will be caused to so move and the device will then be drawn forward until the anchor part engages the rear of the structure as shown in Fig. 1. The usual manner in which the anchor part is caused to so move is to weight it more heavily upon one side of its pivotal center than the other, and to rotate it to a position wherein it will move by gravity in the required direction. After the device has been properly positioned the lugs 12 will be bent over at right angles as shown in Fig. 1 whereby the nut element will be retained securely in position. Thereafter the bolt 18 may be applied, being inserted through the holder from one end to the other, and the threaded end thereof caused to engage the threaded opening 14 in the anchor part. In Fig. 1 I have shown the bolt as so applied, an article 19 being held in position thereby.

The lugs or fingers 12 are of course made sufficiently narrow and thin so that they may be readily bent into place, and the material of which this part of the holder is composed is sufficiently malleable to permit such bending without fracture.

It will be readily seen that the bolt may be withdrawn and replaced at will, without there being any danger of the nut being lost or displaced in consequence thereof.

It may be noted that the tubular form of the holder is not only inexpensive to construct but is also advantageous as forming a guide for the bolt to direct it toward the threaded opening in the anchor part, and as forming a lining for the hole to protect the walls thereof.

While in the broad aspect of my invention it is not necessary that the bolt coact directly with the anchor element, and indeed in a copending application Serial No. 609,341 filed upon even date herewith I have shown the bolt as arranged for coaction with the holder instead, yet it will be noted that such a construction is advantageous, as a greater strength and rigidity results therefrom than is otherwise attainable.

What I claim is:

1. In a device of the character described the combination with an element comprising a holder provided with a flexible retaining lug at one end thereof, adapted to be bent over after the anchor has been inserted in place, and a pivoted anchor element at the other end thereof, of a bolt for coaction with the said element.

2. A device of the character described comprising a holder, a nut pivotally connected thereto at one end, the said holder having an extending lug at its opposite end, adapted to be bent over after the holder has been inserted in place, and a bolt arranged to extend from one end of the holder to the other and to engage the said nut.

3. A device of the character described comprising a tubular holder, a screw threaded nut pivotally connected thereto at one end, the said holder having a longitudinally extending lug at its other end, adapted to be bent over after the holder has been inserted in place, and a threaded bolt arranged to pass through the said holder and to engage the said nut.

4. A device of the character described comprising a tubular holder having ears extending longitudinally thereof at one end, and bendable lugs extending longitudinally thereof at the other end, a nut in the form of a bar having a transversely screw-threaded opening therein, pivotally connected to the ears of the holder, the said holder having a slot in one side thereof to receive one end of the said bar when it is adjusted longitudinally thereof, and a bolt adapted to pass through the said tubular holder, and to engage the screw-threaded portion of the nut when the same is adjusted transversely with respect to the holder.

5. The combination with a relatively stationary holder and a toggle element pivoted thereto, the said toggle element having a transverse screw-threaded opening therethrough, the axis of which is coincident with the axis of the pivotal connection of the toggle element with the holder, and at right angles thereto, of a screw-threaded bolt for direct engagement with the screw-threaded opening in the toggle element.

6. The combination with a relatively stationary holder and a toggle element pivoted thereto at one end thereto, the said toggle element having a transverse screw-threaded opening therethrough, the axis of which is coincident with the axis of the pivotal connection of the toggle element with the holder, and at right angles thereto, the said holder being provided with a flexible retaining lug at its opposite end, adapted to be bent over after the anchor has been inserted in place, of a screw-threaded bolt for direct engagement with the screw-threaded opening in the toggle element.

CHARLES J. CLEMENTS.

Witnesses:
D. HOWARD HAYWOOD,
LYMAN S. ANDREWS, Jr.